(12) United States Patent
Choi et al.

(10) Patent No.: US 8,432,525 B2
(45) Date of Patent: Apr. 30, 2013

(54) BACKLIGHT UNIT AND LIQUID CRYSTAL DISPLAY DEVICE HAVING THE SAME

(75) Inventors: Sang Joon Choi, Chilgok-gun (KR); Young Min Kweon, Gumi-si (KR); Sang Ryeon Park, Gumi-si (KR); Jae Yong Ryu, Gumi-si (KR); Sung Sik Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 12/887,260

(22) Filed: Sep. 21, 2010

(65) Prior Publication Data

US 2011/0069255 A1  Mar. 24, 2011

(30) Foreign Application Priority Data

Sep. 22, 2009 (KR) .................. 10-2009-0089544
Feb. 23, 2010 (KR) .................. 10-2010-0016361

(51) Int. Cl.
*G02F 1/1333* (2006.01)

(52) U.S. Cl.
USPC .................. 349/158; 349/159; 349/160

(58) Field of Classification Search ............... 349/58–60
See application file for complete search history.

(56) References Cited

U.S. PATENT DOCUMENTS

2008/0024694 A1* 1/2008 Kondo et al. .................. 349/58
2010/0149451 A1* 6/2010 Tanaka ............................ 349/58

* cited by examiner

*Primary Examiner* — Phu Vu
(74) *Attorney, Agent, or Firm* — Birch, Stewart, Kolasch & Birch, LLP

(57) ABSTRACT

A backlight unit that is easy to slim and simplify the configuration is disclosed. The backlight unit includes: a lower case with an opened upper surface; at least one light source unit disposed at an inner side surface of the lower case; and a modularized optical unit disposed parallel to the light source unit and configured to include a light guide plate and optical sheets which are accommodated into a reflection sheet.

16 Claims, 4 Drawing Sheets

BACKLIGHT UNIT AND LIQUID CRYSTAL DISPLAY DEVICE HAVING THE SAME

CROSS-REFERENCE TO RELATED APPLICATION

These applications claim priority under 35 U.S.C. §119 to Korean Patent Application Nos. 10-2009-0089544 and 10-2010-0016361, filed respectively on Sep. 22, 2009 and Feb. 23, 2010, all of which are hereby incorporated by reference in their entirety.

BACKGROUND

1. Field of the Disclosure

This disclosure relates to a backlight unit, and more particularly to a backlight unit that is easier to slim and simplify the configuration, and a liquid crystal display (LCD) device with the same.

2. Description of the Related Art

Cathode ray tubes (CRTs) correspond to one of display devices which are widely used. The CRTs are mainly used as monitors for TVs, measuring apparatuses, information terminals, and so on. However, the heavy weight and large size of the CRTs have been a major hindrance to the manufacturing of small, light electronic products.

To address this matter, LCD devices are gradually being used in a wide range of applications due to their advantages such as light weight, thin thickness, and low power consumption. Furthermore, LCD devices are being manufactured to have even larger screens, be thinner, and consume less power, in order to meet requirements of users.

LCD devices display images by controlling the amount of light transmitted through liquid crystal. However, LCD devices are not self-illuminating display devices, unlike CRTs. As such, an LCD device includes a backlight unit configured to have a separate light source, which provides light necessary to display an image, and disposed on the rear surface of an LCD panel. The backlight unit is classified as either an edge type or a direct type in accordance with the disposition of its light source.

The LCD panel is used to display an image. To this end, the LCD panel includes a thin film transistor substrate and a color filter substrate disposed to face each other and combined with each other by a seal pattern. Also, the LCD panel further includes a liquid crystal material which is injected between the thin film transistor substrate and the color filter substrate after the combination of two substrates.

The edge type backlight unit includes a light source which is disposed in a position corresponding to a side of the LCD panel. Also, the edge type backlight unit irradiates light emitted from the light source onto the entire surface of the LCD panel using a light guide plate. As such, it is easy for the edge type backlight unit to be made thinner. Therefore, the edge type backlight is mainly used for middle and small sized LCD devices.

On the other hand, the direct type backlight unit includes a plurality of light sources arranged at a fixed distance under the LCD panel. The plurality of light sources directly applies light to the rear surface of the LCD panel. The direct type backlight unit can provide a higher brightness and a wider luminescent surface than the edge type backlight unit because it employs a plurality of light sources. Accordingly, the direct type backlight unit is mainly used for large sized LCD devices.

An LCD device with the edge type backlight unit enables light output from the light source, which is disposed at a side area, to pass through the light guide plate. At this time, light from the light source is converted into two-dimensional light by the light guide plate. The LCD panel displays an image using two-dimensional light output from the light guide plate.

Such an LCD device includes an LCD module with the LCD panel disposed on the backlight unit. The LCD panel is combined with the backlight unit by engaging a top case and a bottom cover of the backlight unit, thereby completing the assembling of the LCD module. The top case is formed to encompass the upper surface edges of the LCD panel.

The assembled LCD module is placed within a cavity between upper and lower system cases which encompass the top case and the bottom cover, respectively. Also, a system driver configured to drive the LCD module is installed within the lower system case, thereby providing a completed LCD device.

In this manner, the ordinary LCD device is configured with complexity. As such, the assembling time of the ordinary LCD device becomes longer. Therefore, it is difficult to minimize the manufacturing time of the LCD device. Moreover, the complex configuration of the ordinary LCD device makes it difficult not only to reduce the total weight but also to implement slimness.

BRIEF SUMMARY

Accordingly, the present embodiments are directed to a backlight unit that substantially obviates one or more of problems due to the limitations and disadvantages of the related art, and to an LCD device with the same.

An object of the present embodiments is to provide a backlight that is easier to slim and simplify the configuration, and a liquid crystal display (LCD) device with the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes: a lower case with an opened upper surface; at least one light source unit disposed at an inner side surface of the lower case; and a modularized optical unit disposed parallel to the light source unit and configured to include a light guide plate and optical sheets which are accommodated into a reflection sheet.

An LCD device according to one general aspect of the present embodiment includes: a liquid crystal display panel; an upper case disposed on the liquid crystal display panel and configured to encompass edges of the liquid crystal display panel; first and second guide members disposed at each of two opposite corners adjacent to a side surface of the liquid crystal display panel, combined with the upper case, and configured to support the liquid crystal display panel; an optical unit disposed under the liquid crystal display panel; a light source unit disposed on a side surface of the optical unit; a lower case configured to encompass the optical unit and the light source unit; and third and fourth guide members disposed at each of two opposite corners adjacent to the other opposite side surface of the liquid crystal display panel, combined with the upper case, and configured to support the optical unit.

An LCD device according to another aspect of the present embodiment includes: a liquid crystal display panel; first and second upper cases disposed on the liquid crystal display panel and configured to encompass two opposite edge portions of the liquid crystal display panel; first and second guide members configured to support the two opposite edge portions of the liquid crystal display panel and combined with the respective first and second upper cases; a backlight unit disposed under the liquid crystal display panel; and a lower case configured to accommodate the backlight unit.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
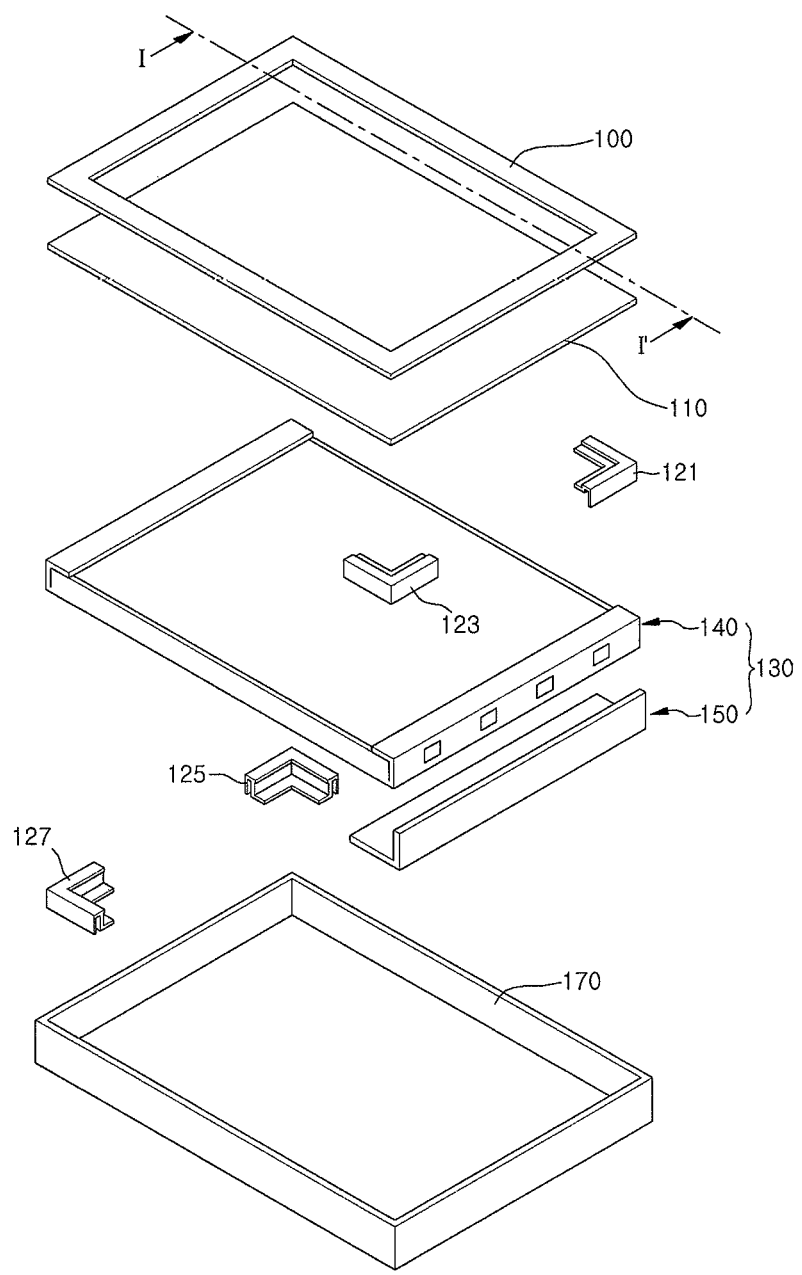
FIG. 1 is a disassembled perspective view showing an LCD device according to an embodiment of the present disclosure.

Reference will now be made in detail to the embodiments of the present invention, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
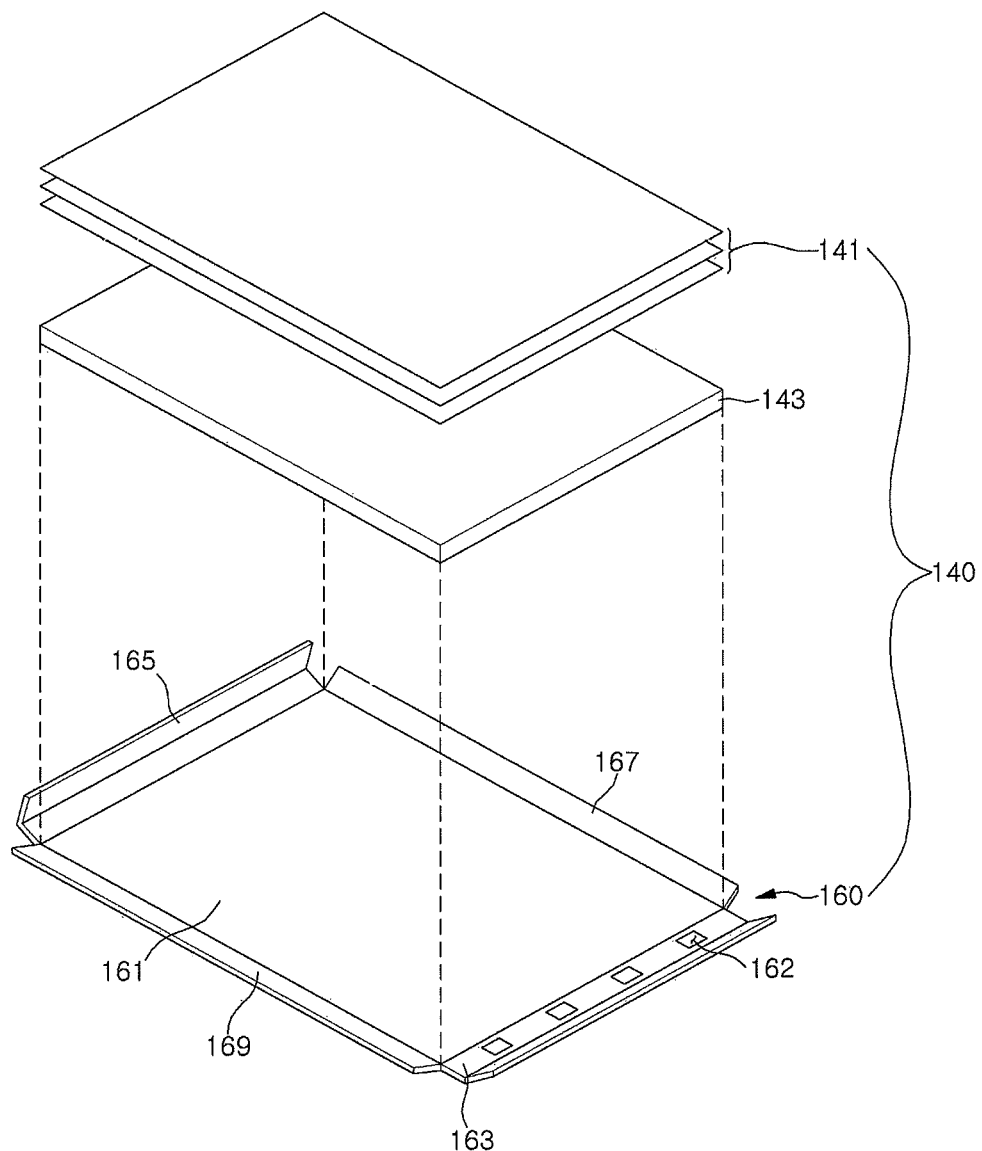
FIG. 2 is a perspective view showing an optical unit shown in FIG. 1.
Figure 3:
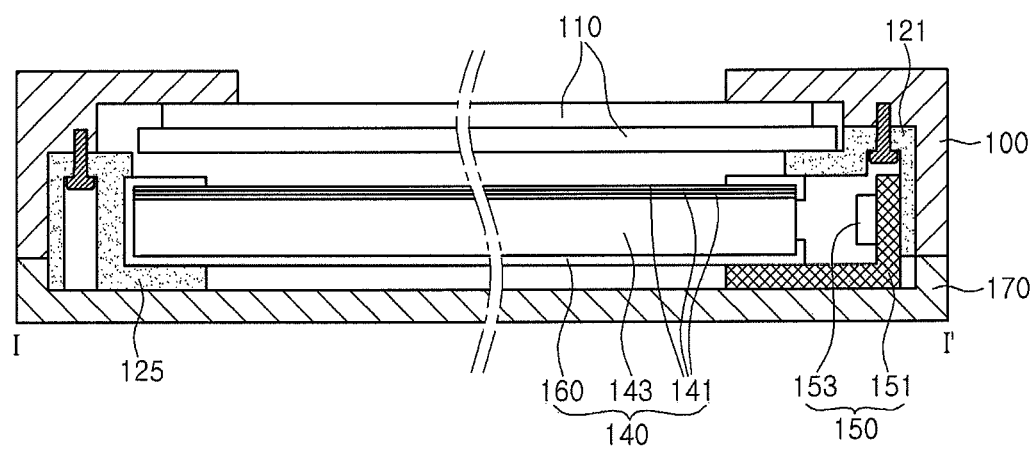
FIG. 3 is a cross-sectional view showing the LCD device taken along a line I-I' of FIG. 1.

FIG. 1 is a disassembled perspective view showing an LCD device according to an embodiment of the present disclosure. FIG. 2 is a perspective view showing an optical unit shown in FIG. 1. FIG. 3 is a cross-sectional view showing the LCD device taken along a line I-I' of FIG. 1.

As shown in FIGS. 1 through 3, an LCD device according to an embodiment of the present disclosure includes an LCD panel 110 configured to display an image, a backlight unit 130 disposed under the LCD panel 110 and configured to provide light. The LCD device further includes upper and lower cases 100 and 170 configured to receive the LCD panel 110 and the backlight unit 130.

Although they are not shown in detail in the drawings, the LCD panel 110 includes a thin film transistor substrate and a color filter substrate disposed to face each other and combined to maintain a uniform cell gap between them, and a liquid crystal layer interposed between the thin film transistor substrate and the color filter substrate. Also, polarizing plates not shown in the drawings are attached to upper and lower surfaces of the LCD panel 110.

The thin film transistor substrate includes a plurality of gate lines and a plurality of data lines formed to cross each other. Also, the thin film transistor substrate further includes a plurality of thin film transistors formed at the intersections of the plurality of gate lines and the plurality of data lines.

The color filter substrate includes red, green, and blue color filters opposite to the pixels; a black matrix rimmed each of the color filters; and a common electrode formed to cover all the color filters and the black matrix. The black matrix shields the gate lines, the data lines, and the thin film transistors. Such a color filter substrate is combined with the thin film transistor substrate by a seal pattern.

The LCD device still further includes a panel driver PCB (printed circuit board) not shown in the drawings. The panel driver PCB is disposed by an edge of the LCD panel 110. The panel driver PCB applies not only scan signals to the gate lines, but also data signals to the data lines.

The backlight unit 130 disposed on the rear surface of the LCD panel 110 includes a light source unit 150 disposed on an inner side surface of the lower case 170 and configured to emit light. Also, the backlight unit 130 includes an optical unit 140 disposed next to the light source unit 150

The light source unit 150 includes a metal PCB 151 configured to be in surface contact with an inner side surface of the lower case 170. The light source unit 150 further includes a plurality of light emission diodes (LEDs) 153 arranged at a fixed interval on an inner side surface of the metal PCB 151.

The metal PCB 151 comes in surface contact with an inner side surface of the lower case 170 and a bottom surface edge adjacent thereto. To this end, the metal PCB 151 is formed in a bent structure. Also, the metal PCB 151 is fastened to the inner surface of the lower case 170 by means of a fixing member such as a screw.

On the other hand, the plurality of LEDs 153 is used as a light source in the present embodiment. However, the present embodiment is not limited to this. For example, the plurality of LEDs 153 can be replaced with a lamp.

The optical unit 140 includes a light guide plate 143 configured to convert incident spot lights from the plurality of LEDs 153 into two-dimensional light, and optical sheets 141 disposed on the light guide plate 143 and configured to scatter and converge light output from the light guide plate 143. The optical unit 140 further includes a reflection sheet 160 configured to accommodate the light guide plate 143 and the optical sheets 141 and to reduce a loss of light.

The light guide plate 143 is formed from poly methyl methacrylate (PMMA). Although it is not shown in the drawings, the light guide plate 143 can be formed in a wedge shape becoming thinner the further away it is from an incident surface on which the LEDs 153 are arranged. The light guide plate 143 can include a prism pattern formed on its rear surface. The prism pattern is used to refract incident light toward the optical sheets 141.

The optical sheets 141 include a diffusion sheet, a converging sheet, and protective sheet. The diffusion sheet scatters light. The converging sheet is used to converge light. The protective sheet is used to protect the converging sheet.

The reflection sheet 160 includes a bottom surface 161 used to support the light guide plate 143, and first through fourth side surface 163, 165, 167, and 169 configured to cover the side surfaces of the light guide plate 143 and optical sheets 141. The first and second side surface 163 and 165 are opposite each other, and are formed to cover the opposite edges of the upper surface of the optical sheets 141. Moreover, the first side surface 163 facing the light source unit 150 has light through holes 162 formed in regions corresponding to the plurality of LEDs 153. In other words, the plurality of light through holes 162 confronting the plurality of LEDs 153 is formed at the fixed interval on the first side surface 163.

Such an optical unit 140 becomes a stand-alone module by placing the light guide plate 143 and the optical sheets 141 on the bottom surface of the reflection sheet 160 and making the first through fourth side surfaces 163, 165, 167, and 169 to encompass the light guide plate 143 and optical sheets 141. Although it is not shown in detail in the drawings, the first through fourth side surfaces 163, 165, 167, and 169 of the reflection sheet 160 can be fastened to each other by means of adhesive tapes or others.

Furthermore, the LCD device of the present embodiment includes: first and second guide members 121 and 123 configured to support the LCD panel 110 and to fix the LCD panel 110 to the upper case 100; and third and fourth guide members 125 and 127 configured to support the optical unit 140 and to fix the optical unit 140 to the upper case 100.

The first and second guide members 121 and 123 are disposed under one side portion of the LCD panel 110. More specifically, the first and second guide members 121 and 123 are disposed on regions corresponding to the opposite lower corners of the LCD panel 110 which are adjacent to the same edge. The first and second guide members 121 and 123 are formed in a single stair structure suitable for supporting the lower corner of the LCD panel 110.

The LCD panel 110 included in the embodiment of the present disclosure is encompassed with the upper case 100 and supported by the first and second guide members 121 and 123. In this case, the first and second guide members 121 and 123 are fixed to the upper case 100 by means of the screws. As such, the LCD panel 110 is securely fastened to the upper case 100.

The third and fourth guide members 125 and 127 are disposed under one side portion of the optical unit 140 corresponding to the other opposite side portion of the LCD panel 110. In this case, the light source unit 150 is disposed on one side surface of the optical unit opposite to that portion. The third and fourth guide members 125 and 127 are fixed to the upper case 100 by means of the screws so as to support the opposite lower corners of the optical unit 140 which are adjacent to the same edge. Since the third and fourth guide members 125 and 127 are fixed to the upper case 100 by the screws, the optical unit 140 can be securely fastened to the upper case 100. Also, the third and fourth guide members 125 and 127 are formed in a single stair structure suitable for supporting the lower corner of the optical unit 140. Such third and fourth guide members 125 and 127 are symmetrically arranged with the first and second guide members 121 and 123.

The upper and lower cases 100 and 170 are combined with each other. In this case, one of the upper and lower cases 100 and 170 can be securely fastened to the other by means of a fixing member such as a screw or others.

In this manner, the LCD device according to one embodiment of the present disclosure fastens the LCD panel 110 and optical unit 140 to the upper case 100 using the first through fourth guide members 121, 123, 125, and 127. As such, the LCD device can have a more simplified configuration than the ordinary LCD device which includes a support main receiving the backlight unit and a panel guider supporting the LCD panel. Moreover, because the support main and the panel guider are removed, the LCD device according to the present disclosure can reduce the total weight and be easily made with slimness.

Also, the LCD device according to one embodiment of the present disclosure allows the optical unit 140 of the backlight unit 130 to have a modularized structure. As such, the LCD device according to the present disclosure can provide an improved assembling efficiency and a reduced assembling time than the ordinary LCD device which includes the structures for fixing the optical sheets and light guide plate and for combining the side portions of the light guide plate with the support main.

In other words, the LCD device according to the present disclosure has the structure which includes only the upper case disposed directly on the LCD panel and the lower case disposed under the LCD panel. As such, the LCD device of the present disclosure is assembled in an end product by combining the upper and lower cases. Therefore, the LCD device of the present disclosure can provide advantages such as a simplified configuration, a reduced manufacturing cost, a lighter weight, and a thinner thickness than those of the ordinary LCD device having the separated top case interposed between the upper case and the LCD panel and the bottom cover disposed on the lower case. This results from the fact that the top case and the bottom cover are removed from the LCD device of one embodiment.

Figure 4:
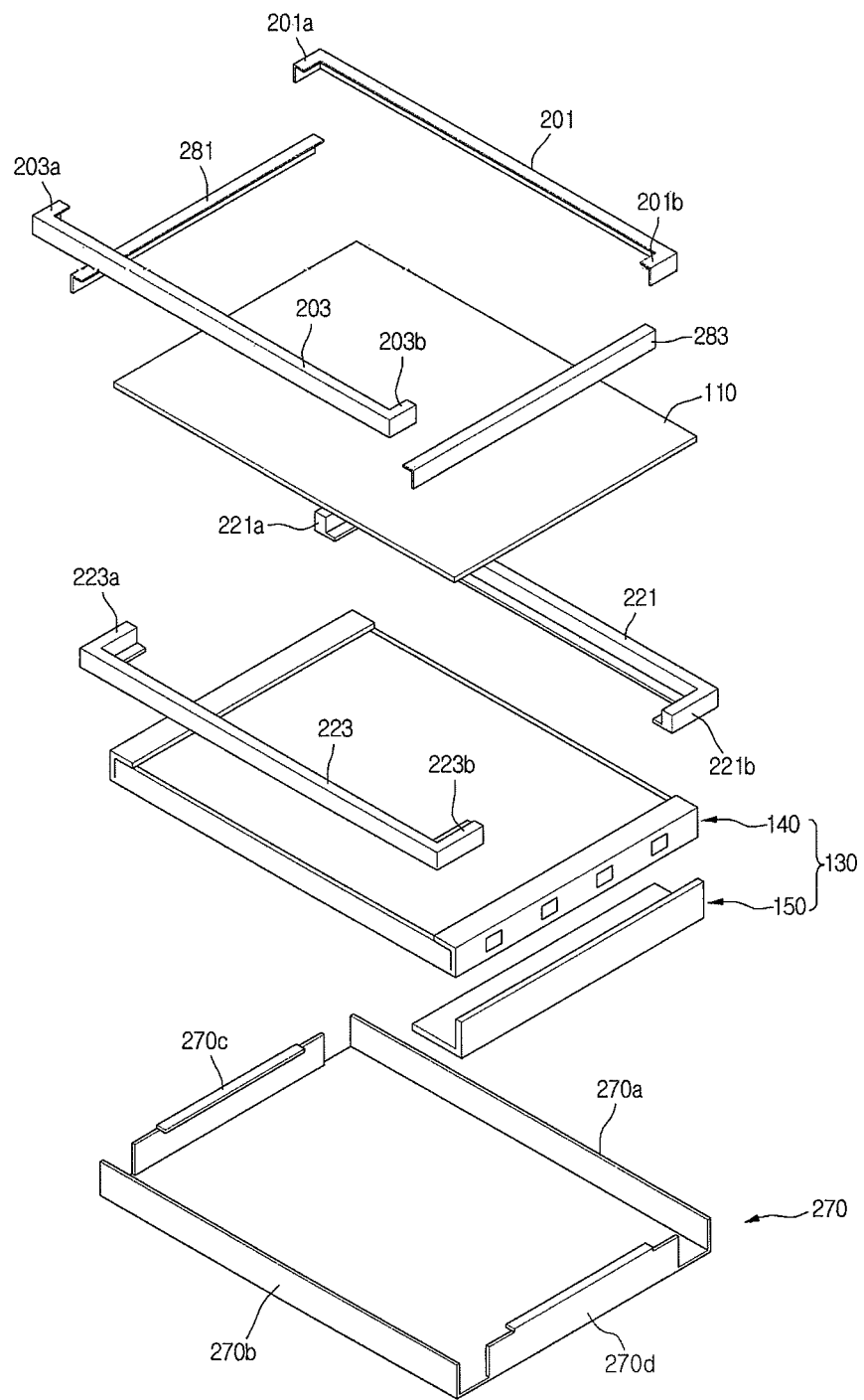
FIG. 4 is a disassembled perspective view showing an LCD device according to another embodiment of the present disclosure.

FIG. 4 is a disassembled perspective view showing an LCD device according to another embodiment of the present disclosure. The LCD device of FIG. 4 has the same configuration as that of one embodiment described above, with the exception of first and second upper cases 201 and 203, first and second light shield tapes 281 and 283, first and second guide members 221 and 223, and a lower case 270. Accordingly, the description of one embodiment to be repeated in another embodiment of the present disclosure will be omitted. Also, the LCD device according to another embodiment of the present disclosure will refer to the same reference numbers for the same elements as that according to the first embodiment.

The LCD device according to another embodiment of the present disclosure includes first and second upper cases 201 and 203 configured to encompass both opposite edge portions of an LCD panel 110. Also, the LCD device includes first and second guide members 221 and 223 configured to support both opposite edge portions of the LCD panel 110.

The first upper case 201 includes first and second wings 201a and 201b configured to protrude from both ends toward the second upper case 203. The first and second wings 201a and 201b are bent perpendicularly to a lengthwise direction of the first upper case 201 so as to encompass both the other opposite edge) portions of the LCD panel 110. Such first and second wings 201a and 201b extended from both ends of the first upper case 201 function to secure the strength of the first upper case 201.

The second upper case 203 includes third and fourth wings 203a and 203b configured to protrude from both ends toward the first upper case 201. The third and fourth wings 203a and 203b are bent perpendicularly to a lengthwise direction of the second upper case 203 so as to encompass both the other opposite edge portions of the LCD panel 110. Such third and fourth wings 203a and 203b extended from both ends of the second upper case 203 function to secure the strength of the second upper case 203.

The first and second guider members 221 and 223 are used to support both opposite side portions of the LCD device 110. Although it is not shown in detail in the drawing, the first and second guide members 221 and 223 can be combined with the first and second upper case 201 and 203 by means of one of hooker and screw, respectively.

The first guide member 221 includes first and second guide wings 221a and 221b configured to protrude from both ends toward the second guide member 223. The first and second guide wings 221a and 221b are bent perpendicularly to the lengthwise direction of the first guide member 221 so as to support both the other opposite edge portions of the LCD panel 110. Such first and second guide wings 221a and 221b extended from both ends of the first guide member 221 are used to secure the strength of the first guide member 221.

The second guide member 223 includes third and fourth guide wings 223a and 223b configured to protrude from its both ends toward the first guide member 221. The third and fourth guide wings 223a and 223b are bent perpendicularly to the lengthy direction of the second guide member 223 so as to support both the other opposite edge portions of the LCD panel 110. Such third and fourth guide wings 223a and 223b extended from both ends of the second guide member 223 are used to secure the strength of the second guide member 223.

The LCD device according to another embodiment of the present disclosure further includes a lower case 270 configured with first and second side walls 270a and 270b opposite to each other and third and fourth side walls 270c and 270d opposite to each other. The top edges of third and fourth side walls 270c and 270d are bent in an inward direction of the lower case 270. The third and fourth side walls 270c and 270d with the bent top edges of the third and fourth side walls 270c and 270d allow the backlight unit 130 to be more securely fastened.

Moreover, the LCD device according to another embodiment of the present disclosure includes first and second light shield tapes 281 and 283 configured to face the third and fourth side walls 270c and 270d of the lower case 270. The first and second light shield tapes 281 and 283 are used to prevent the leakage of light in both the other opposite edge portions of the LCD panel 110 which are not covered with the first and second upper cases 201 and 203 and not supported by the first and second guide members 221 and 223. To this end, the first and second light shield tapes 281 and 283 are attached to both the other opposite side surfaces of the LCD panel 110, the upper surface edges adjacent thereto, and the inner surfaces of the third and fourth side walls 270c and 270d of the lower case 270.

In this way, the LCD device according to another embodiment of the present disclosure allows the LCD panel 110 to be not only protected by the first and second upper cases 201 and 203 and supported by the first and second guide members 221 and 223. Therefore, the LCD device of another embodiment makes it easier to slim and to reduce the total weight in comparison with the ordinary LCD device.

More specifically, the LCD device of another embodiment has the structure which includes the first and second upper cases 201 and 203 disposed directly on the LCD panel and the lower case configured to receive the components of the backlight unit 130. As such, the LCD device of another embodiment is assembled in an end product by combining the first and second upper cases 201 and 203 with the lower case 270. Therefore, the LCD device of another embodiment can provide advantages such as a simplified configuration, a reduced manufacturing cost, a lighter weight, and a thinner thickness than those of the ordinary LCD device having the separated top case interposed between the first and second upper cases 201 and 203 and the LCD panel 110 and the separated bottom cover disposed on the lower case. This results from the fact that the top case and the bottom cover are removed from the LCD device of another embodiment.

Although the present disclosure has been explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit comprising:
a lower case with an opened upper surface:
at least one light source unit disposed at an inner side surface of the lower case; and
a modularized optical unit disposed parallel to the light source unit and configured to include a light guide plate and optical sheets which are accommodated into a reflection sheet,
wherein the reflection sheet of the optical unit includes:
a bottom surface configured to support the light guide plate,
first and second side surfaces configured to cover opposite side surfaces of the light guide plate and opposite upper surface edges of the optical sheets, and
third and fourth side surfaces configured to cover the other opposite side surfaces of the light guide plate and optical sheets, and
wherein the first side surface is configured to face the light source unit and to include a plurality of light through holes which are formed in regions corresponding to the plurality of light emission diodes.

2. The backlight unit claimed as claim 1, wherein the light source unit includes a plurality of light emission diodes arranged at a fixed interval on a metal PCB (printed circuit board).

3. A liquid crystal display device comprising:
a liquid crystal display panel;
an upper case disposed on the liquid crystal display panel and configured to encompass edges of the liquid crystal display panel;
first and second guide members disposed at each of two opposite corners adjacent to a side surface of the liquid crystal display panel, combined with the upper case, and configured to support the liquid crystal display panel;
an optical unit disposed under the liquid crystal display panel;
a light source unit disposed on a side surface of the optical unit;
a lower case configured to encompass the optical unit and the light source unit; and
third and fourth guide members disposed at each of two opposite corners adjacent to the other opposite side surface of the liquid crystal display panel, combined with the upper case, and configured to support the optical unit.

4. The liquid crystal display device claimed as claim 3, wherein the optical unit includes a reflection sheet configured to accommodate a light guide plate and optical sheets.

5. The liquid crystal display device claimed as claim 4, wherein the reflection sheet of the optical unit includes:
a bottom surface configured to support the light guide plate,
first and second side surfaces configured to cover opposite side surfaces of the light guide plate and opposite upper surface edges of the optical sheets, and
third and fourth side surfaces configured to cover the other opposite side surfaces of the light guide plate and optical sheets.

6. The liquid crystal display device claimed as claim 5, wherein the light source unit includes a plurality of light emission diodes arranged at a fixed interval on a metal PCB (printed circuit board).

7. The liquid crystal display device claimed as claim 6, wherein the first side surface is configured to face the light source unit and to include a plurality of light through holes which are formed in regions corresponding to the plurality of light emission diodes.

8. The liquid crystal display device claimed as claim 4, wherein the first and second guide members are formed in a single stair structure suitable for supporting the lower corner of the liquid crystal display panel.

9. The liquid crystal display device claimed as claim 4, wherein the third and fourth guide members are formed in a single stair structure suitable for supporting the lower corners of the optical unit corresponding to the other opposite side corners of the liquid crystal display panel.

10. The liquid crystal display device claimed as claim 4, wherein the first and second guide members are symmetrically arranged with the third and fourth guide members.

11. The liquid crystal display device claimed as claim 4, wherein the first through fourth guide members are fastened to the upper case by a fixing member.

12. A liquid crystal display device comprising:
a liquid crystal display panel;
first and second upper cases disposed on the liquid crystal display panel and configured to encompass two opposite edge portions of the liquid crystal display panel;
first and second guide members configured to support the two opposite edge portions of the liquid crystal display panel and combined with the respective first and second upper cases;
a backlight unit disposed under the liquid crystal display panel; and
a lower case configured to accommodate the backlight unit,
wherein the first guide member includes first and second guide wings formed to bend both ends toward the second guide member and configured to support both the other opposite edge portions of the liquid crystal display panel, and
wherein the second guide member includes third and fourth guide wings formed to bend both ends toward the first guide member and configured to support both the other opposite edge portions of the liquid crystal display panel.

13. The liquid crystal display device claimed as claim 12, wherein the first upper case includes first and second wings formed to bend both ends toward the second upper case and configured to encompass both the other opposite edge portions of the liquid crystal display panel, and
wherein the second upper case includes third and fourth wings formed to bend both ends toward the first upper case and configured to encompass both the other opposite edge portions of the liquid crystal display panel.

14. The liquid crystal display device claimed as claim 12, further comprising first and second light shield tapes configured to prevent the leakage of light in both the opposite edge portions of the liquid crystal display panel.

15. The liquid crystal display device claimed as claim 14, wherein the first and second light shield tapes come in surface contact with both the other opposite edge portions of the liquid crystal display panel and two opposite side walls of the lower case.

16. The liquid crystal display device claimed as claim 12, wherein the two opposite side walls of the lower case each have a top edge bent toward an inner direction and configured to securely fasten the backlight unit.

\* \* \* \* \*